(12) United States Patent
Nakazawa et al.

(10) Patent No.: US 11,125,166 B2
(45) Date of Patent: Sep. 21, 2021

(54) CONTROL SYSTEM, GAS TURBINE, POWER GENERATION PLANT, AND METHOD OF CONTROLLING FUEL TEMPERATURE

(71) Applicant: Mitsubishi Hitachi Power Systems, Ltd., Kanagawa (JP)

(72) Inventors: Yuki Nakazawa, Tokyo (JP); Akihiko Saito, Tokyo (JP); Hiroyuki Nakagawa, Yokohama (JP); Ryo Koto, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 133 days.

(21) Appl. No.: 16/475,246

(22) PCT Filed: Jan. 11, 2018

(86) PCT No.: PCT/JP2018/000499
§ 371 (c)(1),
(2) Date: Jul. 1, 2019

(87) PCT Pub. No.: WO2018/131654
PCT Pub. Date: Jul. 19, 2018

(65) Prior Publication Data
US 2019/0331031 A1     Oct. 31, 2019

(30) Foreign Application Priority Data

Jan. 16, 2017 (JP) .............................. JP2017-005030

(51) Int. Cl.
*F02C 6/18* (2006.01)
*F02C 7/224* (2006.01)
(Continued)

(52) U.S. Cl.
CPC .............. *F02C 7/224* (2013.01); *F01K 23/10* (2013.01); *F02C 6/18* (2013.01); *F02C 9/26* (2013.01); *F23R 3/28* (2013.01)

(58) Field of Classification Search
CPC .... F02C 7/22; F02C 7/224; F02C 6/18; F02C 9/26; F02C 9/28; F01K 23/10; F01K 23/101; F01K 23/106; F01K 23/14
See application file for complete search history.

(56) References Cited

U.S. PATENT DOCUMENTS 5,644,911 A * 7/1997 Huber .................. F01K 25/005
                                                         60/39.465
8,528,335 B2 * 9/2013 Bilton ....................... F02C 9/26
                                                              60/736

(Continued)

FOREIGN PATENT DOCUMENTS

EP       0 931 911       7/1999
JP       10-306708      11/1998
(Continued)

OTHER PUBLICATIONS

International Search Report dated Feb. 27, 2018 in International (PCT) Application No. PCT/JP2018/000499 with English translation.

(Continued)

*Primary Examiner* — William H Rodriguez
(74) *Attorney, Agent, or Firm* — Wenderoth, Lind & Ponack, L.L.P.

(57) ABSTRACT

A control system is configured to control a temperature of a fuel which is supplied to a combustor of a gas turbine via a fuel gas heater, which is configured to heat the fuel of the gas turbine, by adjusting a flow rate of heated water which is supplied to the fuel gas heater. The control system includes a water flow rate adjusting unit configured to adjust the flow rate of the heated water which is supplied to the fuel gas
(Continued)

heater based on a difference between a target temperature of the fuel and the temperature of the fuel on an outlet side of the fuel gas heater.

11 Claims, 11 Drawing Sheets

(51) Int. Cl.
*F02C 9/26* (2006.01)
*F01K 23/10* (2006.01)
*F23R 3/28* (2006.01)

(56) References Cited

U.S. PATENT DOCUMENTS

| | | | |
|---|---|---|---|
| 2010/0031625 A1* | 2/2010 | Narayan | F01K 23/106 60/39.5 |
| 2010/0031660 A1* | 2/2010 | Narayan | F02C 7/224 60/734 |
| 2011/0185702 A1* | 8/2011 | Bilton | F02C 9/26 60/39.182 |
| 2011/0283706 A1* | 11/2011 | Rancruel | F02C 6/18 60/736 |
| 2019/0063327 A1* | 2/2019 | Sekiguchi | F02C 7/224 |
| 2020/0032713 A1* | 1/2020 | Nakazawa | F02C 6/18 |

FOREIGN PATENT DOCUMENTS

| | | |
|---|---|---|
| JP | 11-2105 | 1/1999 |
| JP | 11-200816 | 7/1999 |
| JP | 11-303651 | 11/1999 |
| JP | 2000-161084 | 6/2000 |
| JP | 2002-055722 | 2/2002 |
| JP | 2002-256816 | 9/2002 |
| JP | 2012-184735 | 9/2012 |
| JP | 2013-185454 | 9/2013 |
| JP | 2015-175353 | 10/2015 |

OTHER PUBLICATIONS

Written Opinion of the International Searching Authority dated Feb. 27, 2018 in International (PCT) Application No. PCT/JP2018/000499 with English translation.

\* cited by examiner

CONTROL SYSTEM, GAS TURBINE, POWER GENERATION PLANT, AND METHOD OF CONTROLLING FUEL TEMPERATURE

CROSS-REFERENCE TO RELATED APPLICATION

Priority is claimed from Japanese Patent Application No. 2017-005030, filed Jan. 16, 2017, the content of which is incorporated herein by reference.

TECHNICAL FIELD

The invention relates to a control system, a gas turbine, a power generation plant, and a method of controlling a fuel temperature.

BACKGROUND ART

In a gas turbine combined cycle (GTCC) plant for generation of power, a fuel gas heater (FGH) is provided in a fuel system for the purpose of control of a temperature of a fuel which is supplied to a gas turbine. In the fuel gas heater, a fuel gas is heated by exchange of heat with heated water from a heat recovery steam generator (HRSG). General control of supply of water to a fuel gas heater will be described below with reference to accompanying drawings. FIG. 14 is a system diagram of a fuel gas heater according to the related art. FIG. 15 is a block diagram illustrating a water supply control process in the fuel gas heater according to the related art. As illustrated in FIG. 14, a fuel gas flows in a direction of an arrow (from right to left in the drawing) and is supplied to a combustor of a gas turbine (GT). On the other hand, water HW (heated water) which is supplied from the heat recovery steam generator flows in a direction of an arrow (from left to right in the drawing), heats the fuel gas in the fuel gas heater 70, and flows to the heat recovery steam generator or a steam condenser.

Opening control of a water flow rate regulator valve 71 according to the related art will be first described below. The water flow rate regulator valve 71 is provided to control a flow rate of heated water which is required for heating fuel and to recover the heated water to the HRSG side (a low-pressure water supply side) during operation of a gas turbine. Opening control of the water flow rate regulator valve 71 will be described below with reference to FIG. 15(a). A function element P10 receives an input of a load of the gas turbine (GTMW) as an input and calculates a degree of valve opening suitable for the GTMW. The degree of opening of the water flow rate regulator valve 71 is controlled such that it reaches the calculated degree of valve opening. In this way, feedforward control based on a load is performed on the water flow rate regulator valve 71 in consideration of valve characteristics in drive modes such as starting, stopping, partial load operation, and rated operation of the gas turbine.

Opening control of a dump valve 72 according to the related art will be described below. The dump valve 72 is provided to control a flow rate of heated water to a fuel gas heater 70 at the time of start and stop of the gas turbine and to dump the heated water to a stem condenser. The dump valve 72 is controlled by feedback control for a target flow rate at the time of start and stop, and the control is switched to control using the water flow rate regulator valve 71 and the dump valve 72 is fully closed at the time of operation with a high load. When a load decreases and a flow rate of a fuel gas passing through the fuel gas heater 70 decreases, control for opening the dump valve by the feedback control is performed. Opening control logic of the dump valve 72 is illustrated in FIG. 15(b). The function element D10 receives a load (GTMW) of the gas turbine as an input and converts the input load to a target flow rate F1 suitable for the GTMW. A subtractor D11 calculates a difference between the target flow rate F1 and an actual water flow rate F2 by subtracting the flow rate F2 measured by a flowmeter 16 from the target flow rate F1. Then, a controller D12 calculates a degree of valve opening for causing the difference to approach 0 by PI control and performs control such that the degree of opening of the dump valve 72 reaches the calculated degree of valve opening.

Japanese Unexamined Patent Application, First Publication No. 2002-256816 describes that, regarding a problem in which water is steamed due to operation with excessive fuel because adjustment of decreasing a fuel gas is insufficient with respect to a decrease in an amount of water based on a decrease in the output of a steam turbine in temperature adjustment of water for heating fuel at the time of partial load operation in a combined plant, an amount of water which is likely to be insufficient is supplemented by providing a recirculation system for recirculating water.

SUMMARY OF INVENTION

Technical Problem

As described above, the fuel gas heater 70 heats a fuel gas using heated water from the heat recovery steam generator, but since the heated water which is supplied to the fuel gas heater 70 is controlled by control for supplying a flow rate corresponding to a load of the gas turbine, there is a likelihood that the temperature of the fuel gas on the outlet side of the fuel gas heater 70 will not be controlled to a desired value.

The invention provides a control system, a gas turbine, a power generation plant, and a method of controlling a fuel temperature that can solve the above-mentioned problem.

Solution to Problem

According to a first aspect of the invention, there is provided a control system that controls a temperature of fuel which is supplied to a combustor of a gas turbine via a fuel gas heater, which heats the fuel of the gas turbine, by adjusting a flow rate of heated water which is supplied to the fuel gas heater, the control system including: a water flow rate adjusting unit that adjusts the flow rate of the heated water which is supplied to the fuel gas heater based on a difference between a target temperature of the fuel and the temperature of the fuel on an outlet side of the fuel gas heater.

In a second aspect of the invention, the control system may control the temperature of the fuel by controlling the flow rate of the heated water which is supplied from a supply device of heated water to the fuel gas heater by adjusting a degree of opening of a water flow rate regulator valve that regulates a flow rate of heated water which is recovered from the fuel gas heater to the supply device of heated water and a degree of opening of a dump valve that regulates a flow rate of heated water which is dumped to a steam condenser, and the water flow rate adjusting unit may include: a first valve opening calculating unit that calculates a first valve opening which is a degree of opening of the water flow rate regulator valve based on a load of the gas turbine; a third valve opening calculating unit that calculates a third valve opening by calculating a correction value based on a difference between the target temperature of the fuel which is supplied to the combustor of the gas turbine and the temperature of the fuel on the outlet side of the fuel gas heater and adding the calculated correction value to the first valve opening; a water flow rate regulator valve control unit that controls the degree of opening of the water flow rate regulator valve on the basis of the third valve opening; and a dump valve control unit that controls the degree of opening of the dump valve on the basis of a difference between a target flow rate of the heated water which is determined in advance on the basis of the load of the gas turbine and an actual flow rate.

In a third aspect of the invention, the third valve opening calculating unit may perform calculation of the correction value based on the difference between the target temperature of the fuel and the temperature of the fuel on the outlet side of the fuel gas heater by feedback control.

In a fourth aspect of the invention, the control system may further include a second valve opening calculating unit that calculates a second valve opening by multiplying the first valve opening by a coefficient based on a temperature of the fuel on an inlet side of the fuel gas heater, and the third valve opening calculating unit may calculate the third valve opening by adding the correction value to the second valve opening instead of the first valve opening.

In a fifth aspect of the invention, the dump valve control unit may control the degree of opening of the dump valve using a flow rate which is less than the flow rate of the heated water passing through the water flow rate regulator valve as a target flow rate.

In a sixth aspect of the invention, the dump valve control unit may set a flow rate which is less than the flow rate of the heated water passing through the water flow rate regulator valve as the target flow rate when the load of the gas turbine is equal to or greater than a predetermined value.

In a seventh aspect of the invention, the control system may control the temperature of the fuel by controlling the flow rate of the heated water which is supplied from a supply device of heated water to the fuel gas heater by adjusting a degree of opening of a three-way valve, which is provided upstream in a path of the heated water in the fuel gas heater and switches a proportion of the heated water sent out to the fuel gas heater and a proportion of the heated water sent out to a path bypassing the fuel gas heater, a degree of opening of a water flow rate regulator valve that regulates a flow rate of heated water which is recovered from the fuel gas heater to the supply device of heated water, and a degree of opening of a dump valve that regulates a flow rate of heated water which is dumped to a steam condenser. The water flow rate adjusting unit may include: a first valve opening calculating unit that calculates a first valve opening which is a degree of opening of the water flow rate regulator valve based on a load of the gas turbine; a water flow rate regulator valve control unit that controls the degree of opening of the water flow rate regulator valve on the basis of the first valve opening; a dump valve control unit that controls the degree of opening of the dump valve on the basis of a difference between a target flow rate of the heated water which is determined in advance on the basis of the load of the gas turbine and an actual flow rate; and a three-way valve control unit that controls the degree of opening of the three-way valve on the basis of a difference between a target temperature of the fuel and the temperature of the fuel on the outlet side of the fuel gas heater.

According to an eighth aspect of the invention, there is provided a control system that controls a temperature of fuel by controlling a flow rate of heated water which is supplied from a supply device of heated water to a fuel gas heater that heats fuel of a gas turbine by adjusting a degree of opening of a water flow rate regulator valve that regulates a flow rate of heated water which is recovered to the supply device of heated water and a degree of opening of a dump valve that regulates a flow rate of heated water which is dumped to a steam condenser, the control system including: a first valve opening calculating unit that calculates a first valve opening which is a degree of opening of the water flow rate regulator valve based on a load of the gas turbine; a second valve opening calculating unit that calculates a second valve opening by multiplying a coefficient based on the temperature of the fuel on an inlet side of the fuel gas heater by the first valve opening; and a water flow rate regulator valve control unit that controls the degree of opening of the water flow rate regulator valve on the basis of the second valve opening.

According to a ninth aspect of the invention, there is provided a gas turbine including a compressor, a combustor, a turbine, and the control system according to any one of the above-mentioned aspects.

According to a tenth aspect of the invention, there is provided a power generation plant including: the gas turbine according to the ninth aspect, a steam turbine, and a power generator.

According to an eleventh aspect of the invention, there is provided a method of controlling a fuel temperature, comprising causing a control system that controls a temperature of fuel which is supplied to a combustor of a gas turbine via a fuel gas heater, which heats the fuel of the gas turbine, by adjusting a flow rate of heated water which is supplied to the fuel gas heater to perform adjusting the flow rate of the heated water which is supplied to the fuel gas heater on the basis of a difference between a target temperature of the fuel and the temperature of the fuel on an outlet side of the fuel gas heater.

Advantageous Effects of Invention

With the control system, the gas turbine, the power generation plant, and the method of controlling a fuel temperature, it is possible to control a temperature of fuel in a desired temperature by controlling a flow rate of water which is supplied to the fuel gas heater while monitoring the temperature of the fuel on the outlet side of the fuel gas heater.

DESCRIPTION OF EMBODIMENTS

First Embodiment

Hereinafter, a method of controlling a flow rate of water to a fuel gas heater in a first embodiment of the invention will be described with reference to FIGS. 1 to 5.

Figure 1:
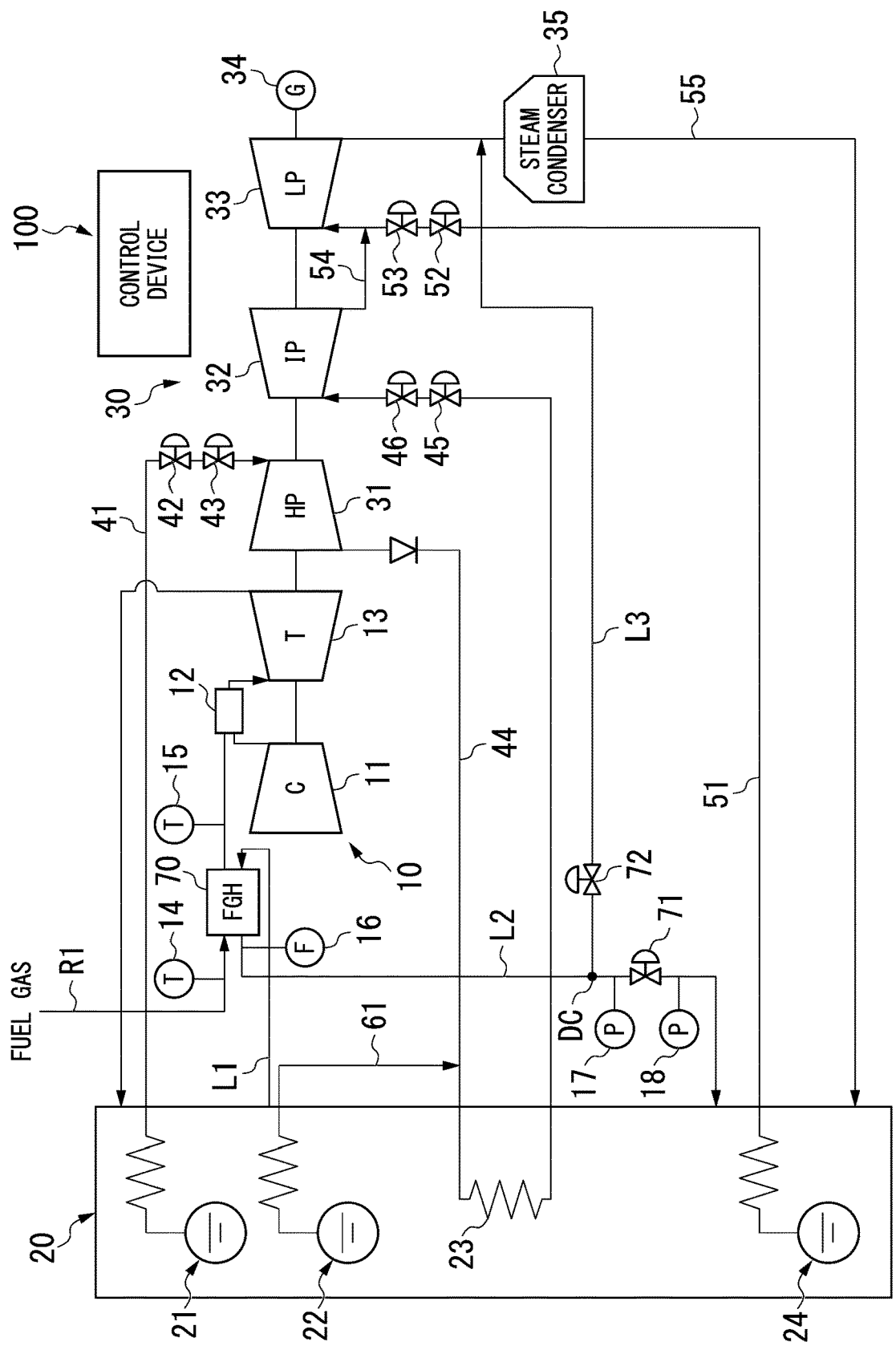
FIG. 1 is a system diagram illustrating an example of a gas turbine combined cycle plant according to first and second embodiments of the invention.

FIG. 1 is a system diagram illustrating a gas turbine combined cycle plant according to first and second embodiments of the invention.

As illustrated in FIG. 1, the gas turbine combined cycle (GTCC) plant according to this embodiment includes a gas turbine 10, a heat recovery steam generator 20 that generates steam using heat of exhaust gas which is discharged from the gas turbine 10, a steam turbine 30 (a high-pressure steam turbine 31, an intermediate-pressure steam turbine 32, and a low-pressure steam turbine 33) that is driven using steam from the heat recovery steam generator 20, a power generator 34 that generates electric power by driving the turbines 10, 31, 32, and 33, a steam condenser 35 that restores steam discharged from the low-pressure steam turbine 33 to water, and a control device 100 that controls the devices.

The gas turbine 10 includes a compressor 11 that compresses outside air to generate compressed air, a combustor 12 that mixes the compressed air with a fuel gas and combusts the mixed gas to generate a combustion gas of a high temperature, and a turbine 13 that is driven with the combustion gas. A fuel line R1 for supplying fuel from a fuel supply device which is not illustrated to the combustor 12 is connected to the combustor 12. A fuel gas heater 70 is provided in the fuel line. An exhaust port of the turbine 13 is connected to the heat recovery steam generator 20.

The fuel gas heater 70 is provided to increase the temperature of a fuel gas to improve heat efficiency in the combustor 12. The fuel gas heater 70 is supplied with a fuel gas of a desired flow rate corresponding to a load from a fuel supply device which is not illustrated. A thermometer 14 is provided on an inlet side of the fuel gas heater 70 in the fuel line R1, and a thermometer 15 is provided on an outlet side thereof. The thermometer 14 measures the temperature of the fuel gas on the inlet side. The thermometer 15 measures the temperature of the fuel gas on the outlet side.

The fuel gas heater 70 is connected to the heat recovery steam generator (HRSG) 20 via a heated water supply line L1. Heated water is supplied to the fuel gas heater 70 from the heat recovery steam generator 20 via the heated water supply line L1. In the fuel gas heater 70, the heated water and the fuel gas supplied from the fuel line R1 exchange heat with each other. At this time, heat moves from the heated water to the fuel gas and the temperature of the fuel gas increases. The fuel gas which has been controlled to a desired high temperature is supplied to the combustor 12. In the related art, the temperature of the fuel gas passing through the fuel gas heater 70 (the temperature of the fuel gas on the outlet side of the fuel gas heater 70) may deviate from a desired temperature. In this embodiment, the temperature of the fuel gas on the outlet side of the fuel gas heater 70 is controlled to a desired temperature using a control method which will be described below. A flowmeter 16 is provided in the heated water supply line L1. The flowmeter 16 measures a flow rate of the heated water which is supplied to the fuel gas heater 70.

One end of a heated water return line L2 is connected to the outlet side of the fuel gas heater 70. The other end of the heated water return line L2 is connected to the heat recovery steam generator 20. The heated water that has exchanged heat in the fuel gas heater 70 is returned to the heat recovery steam generator 20 via the heated water return line L2. A water flow rate regulator valve 71 is provided in the heated water return line L2. The heated water return line L2 branches into a condensed water line L3 at a branch point DC. The condensed water line L3 is connected to the steam condenser 35. A dump valve 72 is provided in the condensed water line L3. Some of the heated water which is returned from the fuel gas heater 70 to the heat recovery steam generator 20 is dumped to the steam condenser 35 via the condensed water line L3 according to a degree of opening of the dump valve 72. The degree of opening of the water flow rate regulator valve 71 or the dump valve 72 is controlled by the control device 100.

The heat recovery steam generator (HRSG) 20 includes a high-pressure steam generating unit 21 that generates high-pressure steam which is supplied to the high-pressure steam turbine 31, an intermediate-pressure steam generating unit 22 that generates intermediate-pressure steam which is supplied to the intermediate-pressure steam turbine 32, a low-pressure steam generating unit 24 that generates low-pressure steam which is supplied to the low-pressure steam turbine 33, and a reheating unit 23 that heats steam discharged from the high-pressure steam turbine 31.

The high-pressure steam generating unit 21 of the heat recovery steam generator 20 and a steam inlet of the high-pressure steam turbine 31 are connected to each other by a high-pressure main steam line 41 that guides high-pressure steam to the high-pressure steam turbine 31, a steam outlet of the high-pressure steam turbine 31 and a steam inlet of the intermediate-pressure steam turbine 32 are connected to each other by an intermediate steam line 44 that guides steam discharged from the high-pressure steam turbine 31 to the steam inlet of the intermediate-pressure steam turbine 32 via the reheating unit 23 of the heat recovery steam generator 20, and the low-pressure steam generating unit 24 of the heat recovery steam generator 20 and a steam inlet of the low-pressure steam turbine 33 are connected to each other by a low-pressure main steam line 51 that guides low-pressure steam to the low-pressure steam turbine 33.

The steam outlet of the intermediate-pressure steam turbine 32 and the steam inlet of the low-pressure steam turbine 33 are connected to each other by an intermediate-pressure turbine exhaust line 54. The steam condenser 35 is connected to the steam outlet of the low-pressure steam turbine 33. A water supply line 55 that guides condensed water to the heat recovery steam generator 20 is connected to the steam condenser 35.

The intermediate-pressure steam generating unit 22 of the heat recovery steam generator 20 and a part of the intermediate steam line 44 upstream from the reheating unit 23 are connected to each other by an intermediate-pressure main steam line 61.

A high-pressure steam stop valve 42 and a high-pressure main steam governor valve 43 that adjusts an amount of steam flowing into the high-pressure steam turbine 31 are provided in the high-pressure main steam line 41. An intermediate-pressure steam stop valve 45 and an intermediate-pressure steam governor valve 46 that adjusts an amount of steam flowing into the intermediate-pressure steam turbine 32 are provided in the intermediate steam line 44. A low-pressure steam stop valve 52 and a low-pressure main steam governor valve 53 that adjusts an amount of steam flowing into the low-pressure steam turbine 33 are provided in the low-pressure main steam line 51.

The control device 100 adjusts the degree of opening of the water flow rate regulator valve 71 or the dump valve 72 and controls a flow rate of heated water which performs heat exchange with a fuel gas in the fuel gas heater 70. Accordingly, the control device 100 controls the temperature of the fuel gas on the outlet side of the fuel gas heater 70 to a desired temperature. In addition, the control device 100 receives various types of operation data or instruction data and the like and generates electric power using the power generator 34 by performing control of the output of the gas turbine 10, control of the output of the steam turbine 30, and the like.

Figure 2:
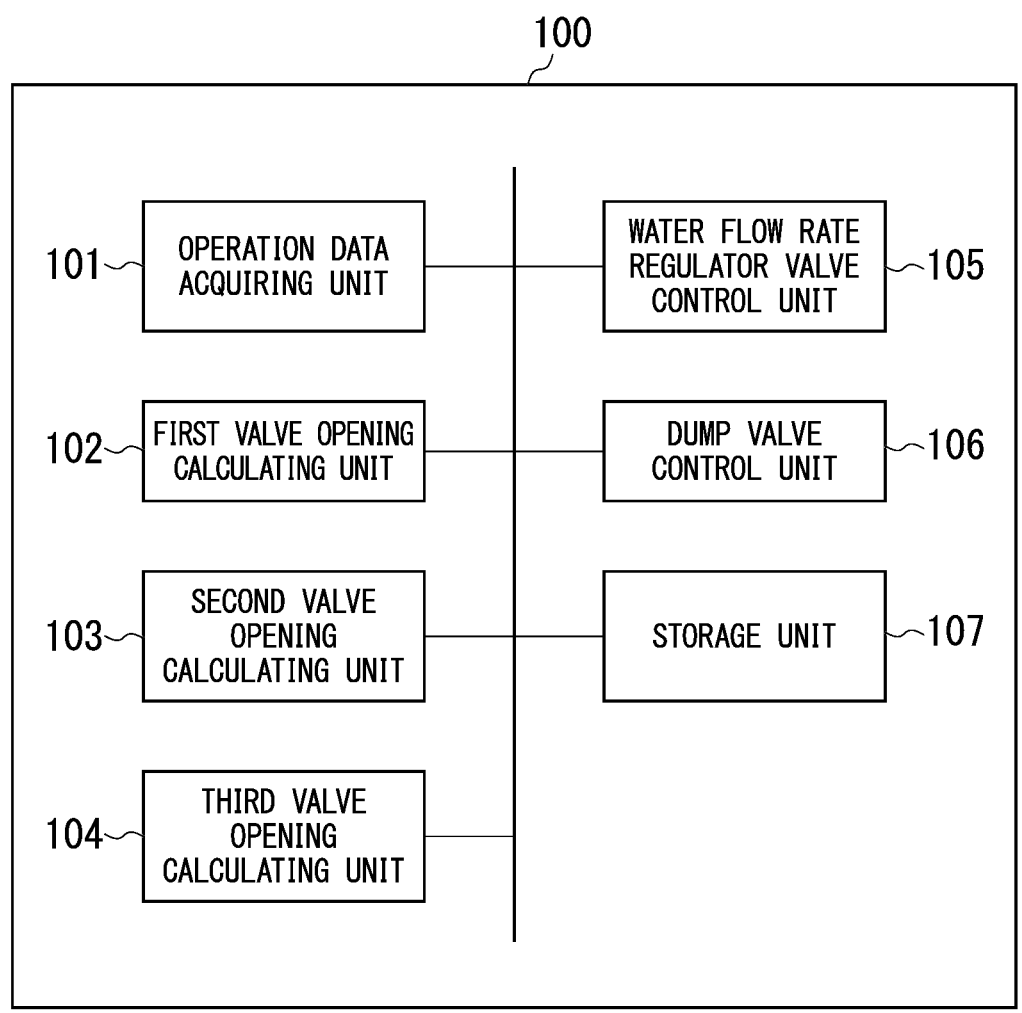
FIG. 2 is a block diagram illustrating a control device according to the first embodiment of the invention.

FIG. 2 is a block diagram of the control device according to the first embodiment of the invention.

The control device 100 controls a flow rate of heated water which is supplied from the heat recovery steam generator 20 to the fuel gas heater 70 by adjusting the degree of opening of the water flow rate regulator valve 71 and the degree of opening of the dump valve 72. The control device 100 controls the temperature of the fuel gas which is supplied to the combustor 12 of the gas turbine 10 via the fuel gas heater 70 by controlling the flow rate of the heated water. The control device 100 is constituted by a computer. As illustrated in the drawing, the control device 100 includes an operation data acquiring unit 101, a first valve opening calculating unit 102, a second valve opening calculating unit 103, a third valve opening calculating unit 104, a water flow rate regulator valve control unit 105, a dump valve control unit 106, and a storage unit 107.

The operation data acquiring unit 101 acquires operation data (such as state quantities and target control values) of the devices (such as the gas turbine 10 and the heat recovery steam generator 20) of the GTCC. For example, the operation data acquiring unit 101 acquires a load (GTMW) of the gas turbine, the measured values of the thermometers 14 and 15, the measured value of the flowmeter 16, and a target temperature of the fuel gas.

The first valve opening calculating unit 102 calculates a valve opening (a first valve opening) of the water flow rate regulator valve 71 according to the load (GTMW) of the gas turbine 10.

The second valve opening calculating unit 103 calculates a second valve opening by multiplying the first valve opening by a coefficient corresponding to the temperature of the fuel on the inlet side of the fuel gas heater 70 measured by the thermometer 14.

The third valve opening calculating unit 104 calculates a third valve opening by adding a correction value based on a difference between a predetermined target temperature of the fuel gas and the temperature of the fuel gas on the outlet side of the fuel gas heater 70 to the second valve opening.

The water flow rate regulator valve control unit 105 controls the degree of opening of the water flow rate regulator valve 71 on the basis of the third valve opening.

The dump valve control unit 106 controls the degree of opening of the dump valve 72 by feedback control according to a difference between a target heated water flow rate corresponding to the load (GTMW) of the gas turbine 10 and an actual heated water flow rate.

The storage unit 107 stores various types of information on the opening control of the water flow rate regulator valve 71 and the dump valve 72.

The control device 100 has various other functions associated with control of the GTCC and description of functions not associated with this embodiment will be omitted.

Figure 3:
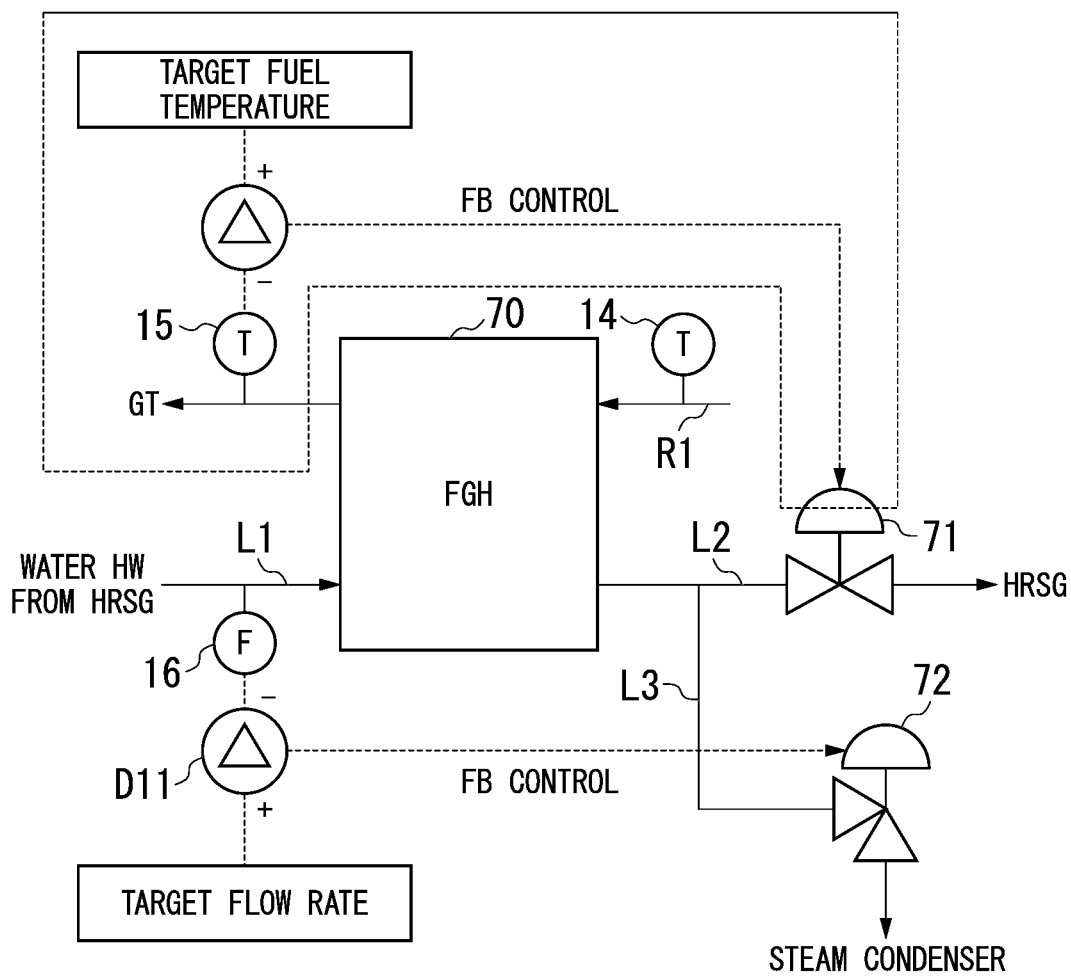
FIG. 3 is a system diagram of a fuel gas heater according to the first embodiment of the invention.

FIG. 3 is a system diagram of the fuel gas heater according to the first embodiment of the invention.

Figure 15:
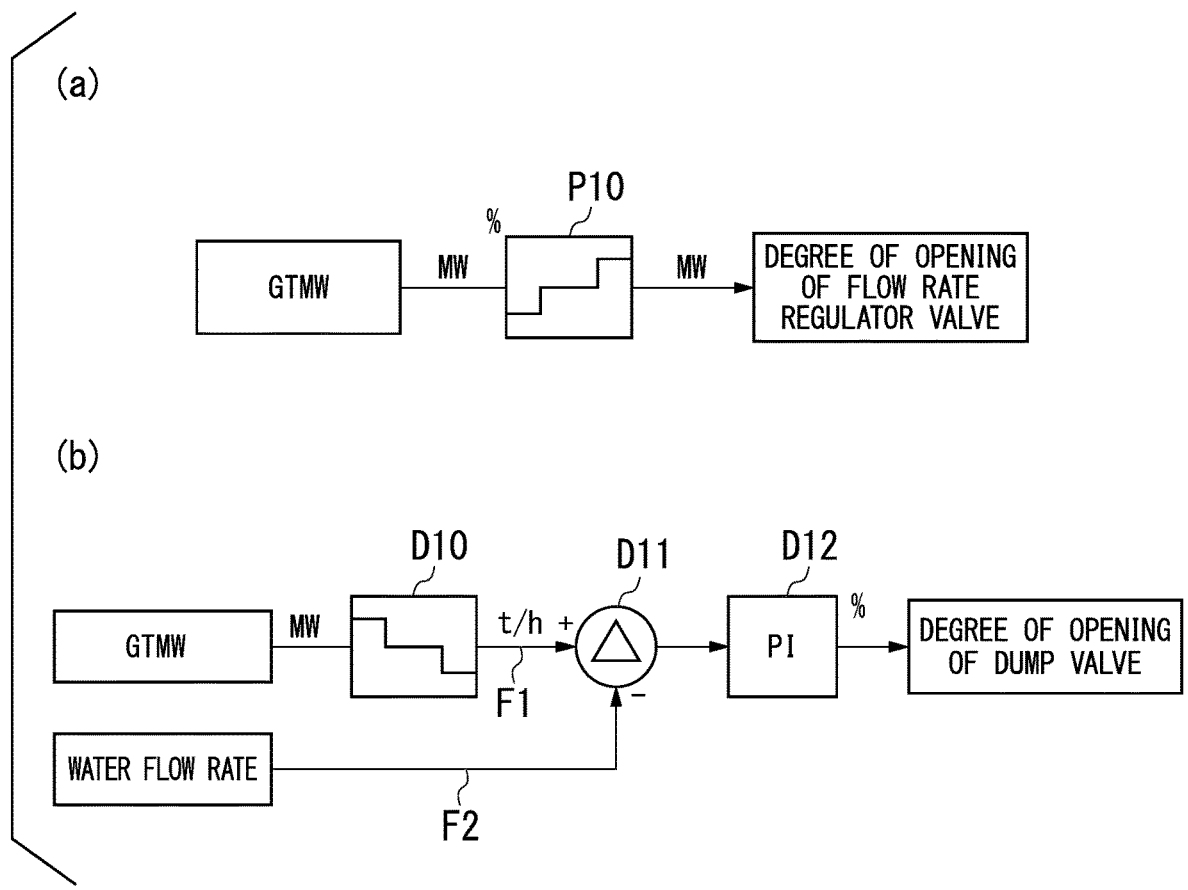
FIG. 15 is a block diagram illustrating a water supply control process in the fuel gas heater according to the related art.

As illustrated in FIG. 3, the fuel gas heater 70 is supplied with a fuel gas via the fuel line R1 and is supplied with heated water via the heated water supply line L1. Heated water flow rate control of this embodiment is characterized in that the flow rate of heated water which is supplied to the fuel gas heater 70 is adjusted by performing control according to the difference between the target temperature of the fuel gas (a target fuel temperature) on the outlet side of the fuel gas heater 70 and an actual measured value of the fuel gas such that the difference approaches 0. In the drawing, the characterized configuration of this embodiment is illustrated in a part surrounded by a dotted line. Control of the dump valve 72 is the same as described with reference to FIG. 15. That is, a function element D10 of the dump valve control unit 106 calculates a target flow rate for control of the dump valve 72. The function element D10 calculates a small target flow rate for a high load and calculates a large target flow rate for a low load. A subtractor D11 of the dump valve control unit 106 calculates a difference between the target flow rate from the function element D10 and the measured flow rate of the heated water from the flowmeter 16. A controller D12 of the dump valve control unit 106 controls the degree of opening of the dump valve 72 by feedback control such that the difference approaches 0. Through this control, the dump valve 72 is controlled such that it is fully closed (0%) when the load of the gas turbine 10 is a high load. For example, at the time of starting, at the time of stopping, and at the time of partial load operation in which the load of the gas turbine 10 is low, the dump valve is adjusted to the degree of opening based on the control in order to secure diversion of the heated water.

Control logic of the dotted part in FIG. 3 will be described below in detail with reference to FIG. 4.

Figure 4:
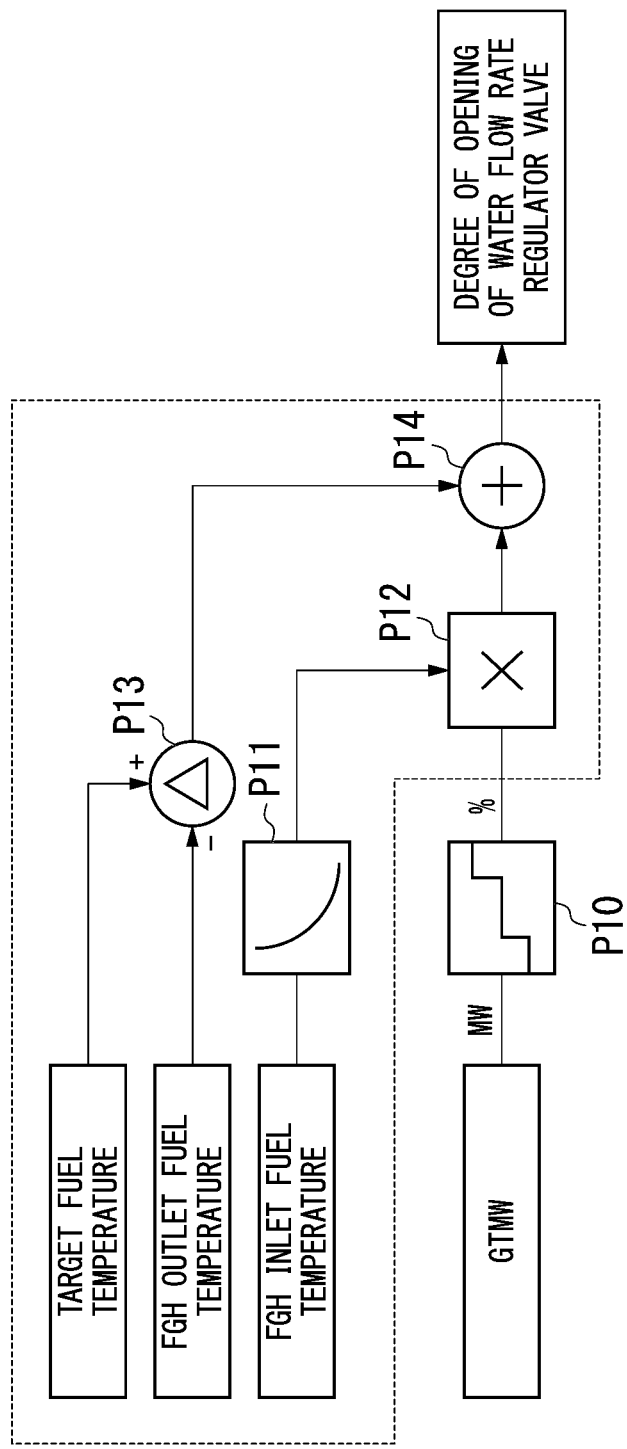
FIG. 4 is a diagram illustrating a method of controlling a flow rate of water which is supplied to the fuel gas heater according to the first embodiment of the invention.

FIG. 4 is a diagram illustrating a method of controlling a flow rate of water to the fuel gas heater in the first embodiment of the invention.

The first valve opening calculating unit 102 includes a function element P10 that converts the load of the gas turbine into a valve opening. The function element P10 is prepared in consideration of valve characteristics of the water flow rate regulator valve 71. The first valve opening calculating unit 102 acquires the load (GTMW) of the gas turbine 10 from the operation data acquiring unit 101. The function element P10 receives an input of the load of the gas turbine 10 and calculates the degree of opening of the water flow rate regulator valve 71 according to the input load. The function element P10 calculates a valve opening having a large value for a high load and calculates a valve opening having a small value for a low load. The function element P10 calculates a valve opening (a first valve opening) corresponding to the valve characteristics of the water flow rate regulator valve 71.

The second valve opening calculating unit 103 includes a function element P11 and a multiplier P12. The second valve opening calculating unit 103 acquires the temperature of the fuel gas on the inlet side of the fuel gas heater 70 measured by the thermometer 14 from the operation data acquiring unit 101. The function element P11 receives an input of the temperature of the fuel gas on the inlet side and calculates a coefficient according to the input temperature. The multiplier P12 receives an input of the coefficient calculated by the function element P11 and the valve opening calculated by the function element P10 and multiplies the two values. That is, the multiplier P12 calculates a valve opening (a second valve opening) of the water flow rate regulator valve 71 corresponding to the load of the gas turbine 10 or the temperature of the fuel gas by multiplying the coefficient (which has a larger value as the temperature of the fuel gas becomes lower) corresponding to the temperature of the fuel gas on the inlet side calculated by the function element P11 by the valve opening corresponding to the load of the gas turbine 10.

The third valve opening calculating unit 104 includes a subtractor P13 and an adder P14. The third valve opening calculating unit 104 acquires the temperature of the fuel gas on the outlet side of the fuel gas heater 70 which is measured by the thermometer 15 from the operation data acquiring unit 101. The third valve opening calculating unit 104 acquires a target temperature of the fuel gas from the operation data acquiring unit 101. The target temperature of the fuel gas may be stored in the storage unit 107 or may be calculated on the basis of, for example, the load of the gas turbine 10 by the control device 100. The subtractor P13 receives an input of the temperature of the fuel gas on the outlet side of the fuel gas heater 70 and a target fuel temperature and calculates a difference therebetween by subtracting the temperature of the fuel gas on the outlet side of the fuel gas heater 70 from the target fuel temperature. The third valve opening calculating unit 104 calculates a correction value of the valve opening based on the difference such that the difference approaches 0. For example, a function for converting the difference into the correction value of the valve opening is stored in the storage unit 107, and the third valve opening calculating unit 104 calculates the correction value of the valve opening using the function. Then, the adder P14 receives an input of the second valve opening calculated by the multiplier P12 and the correction value of the valve opening calculated by the third valve opening calculating unit 104 and adds the two values. That is, the valve opening of the water flow rate regulator valve 71 corresponding to the load of the gas turbine 10 or the temperature of the fuel gas is corrected using the correction value based on the difference between the target temperature of the fuel gas and the actual temperature of the fuel gas (a third valve opening).

The water flow rate regulator valve control unit 105 performs control for matching the degree of opening of the water flow rate regulator valve 71 with the third valve opening.

A flow of a water flow rate control process will be described below in consideration of the process details described above with reference to FIG. 4.

Figure 5:
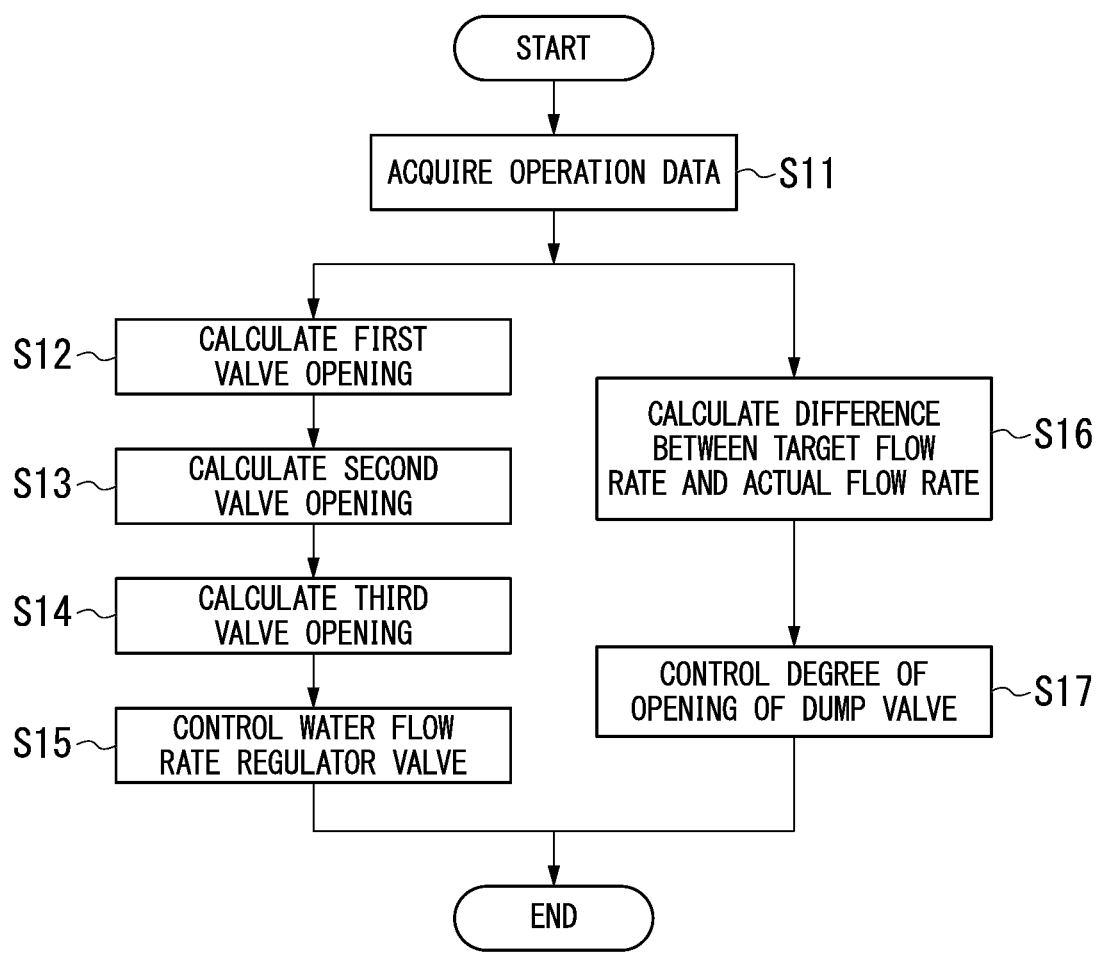
FIG. 5 is a flowchart illustrating an example of a water supply control process according to the first embodiment of the invention.

FIG. 5 is a flowchart illustrating an example of the water flow rate control process according to the first embodiment of the invention.

First, the operation data acquiring unit 101 acquires operation data during operation of the GTCC (Step S11). Specifically, the operation data acquiring unit 101 acquires the magnitude of the load of the gas turbine 10, the measured value of the thermometer 14, the measured value of the thermometer 15, the measured value of the flowmeter 16, and the target fuel temperature.

Then, the first valve opening calculating unit 102 calculates the first valve opening corresponding to the magnitude of the load of the gas turbine 10 using the function element P10 (Step S12). The first valve opening calculating unit 102 outputs the first valve opening to the second valve opening calculating unit 103. Then, the second valve opening calculating unit 103 calculates the second valve opening using the function element P11 and the multiplier P12 (Step S13). The second valve opening calculating unit 103 outputs the first valve opening to the third valve opening calculating unit 104. Then, the third valve opening calculating unit 104 calculates the third valve opening using the subtractor P13 and the adder P14 (Step S14). The third valve opening calculating unit 104 outputs the third valve opening to the water flow rate regulator valve control unit 105. The water flow rate regulator valve control unit 105 outputs the third valve opening as a command value to the water flow rate regulator valve 71 and controls the degree of opening of the water flow rate regulator valve 71 (Step S15).

The dump valve control unit 106 performs the following processes in parallel with Steps S12 to S15. First, the dump valve control unit 106 calculates a target flow rate using the function element D10 and calculates a difference between the target flow rate and the actual flow rate measured by the flowmeter 16 (Step S16). Then, the dump valve control unit 106 calculates a valve opening of the dump valve 72 such that the calculated difference becomes 0, and controls the degree of opening of the dump valve 72 to the calculated valve opening (Step S17). The dump valve control unit 106 continuously performs the processes of Steps S16 to S17 by feedback control (for example, PI control).

According to this embodiment, the temperature of the fuel gas on the outlet side of the fuel gas heater 70 is monitored and the flow rate of heated water which is supplied from the heat recovery steam generator 20 to the fuel gas heater 70 is controlled such that the temperature of the fuel gas on the outlet side approaches the target fuel temperature. That is, when the temperature of the fuel gas on the outlet side is high, the degree of opening of the water flow rate regulator valve 71 is decreased to decrease the flow rate. On the other hand, when the temperature of the fuel gas on the outlet side is low, the water flow rate regulator valve 71 is opened to increase the flow rate of heated water and to heat the fuel gas. Accordingly, the temperature of the fuel gas can be made into a desired temperature.

The second valve opening calculating unit 103 can control the water flow rate regulator valve 71 to a degree of opening more suitable for the current circumstances by multiplying the valve opening thereof by a coefficient based on the fuel temperature on the inlet side of the fuel gas heater 70.

This embodiment is not limited to the above-mentioned configuration. For example, the following embodiments are conceivable.

Modified Example 1

For example, the third valve opening calculating unit 104 may calculate a correction value of the valve opening based on the difference between the measured value of the temperature of the fuel gas and the target fuel temperature, adjust the correction value by feedback control such as PI control, and cause the temperature of the fuel gas on the outlet side of the fuel gas heater 70 to approach the target fuel temperature.

Modified Example 2

For example, the second valve opening calculating unit 103 may not be provided. That is, the first valve opening calculating unit 102 calculates the degree of opening (the first valve opening) of the water flow rate regulator valve 71 based on the load of the gas turbine 10. Then, the third valve opening calculating unit 104 calculates the correction value of the valve opening based on the difference between the temperature of the fuel gas and the target fuel gas and adds the correction value to the first valve opening to calculate the third valve opening. The water flow rate regulator valve control unit 105 performs control for causing the degree of opening of the water flow rate regulator valve 71 to approach the third valve opening.

Modified Example 3

For example, the third valve opening calculating unit 104 may not be provided. That is, the first valve opening calculating unit 102 calculates the degree of opening (the first valve opening) of the water flow rate regulator valve 71 based on the load of the gas turbine 10. Then, the second valve opening calculating unit 103 calculates the second valve opening by multiplying the first valve opening by a coefficient based on the temperature of the fuel gas on the inlet side of the fuel gas heater 70. The water flow rate regulator valve control unit 105 performs control for causing the degree of opening of the water flow rate regulator valve 71 to the second valve opening.

Second Embodiment

Hereinafter, a method of controlling a water flow rate to a fuel gas heater according to a second embodiment of the invention will be described with reference to FIGS. 6 to 8.

A control device 100A according to the second embodiment will be described below. The control device 100A controls the dump valve 72 using a method other than that used in the first embodiment. In the first embodiment, the dump valve control unit 106 calculates the target flow rate using the function element D10. In the second embodiment, a dump valve control unit 106A switches a target flow rate for controlling the dump vale 72 on the basis of the load of the gas turbine 10.

Figure 6:
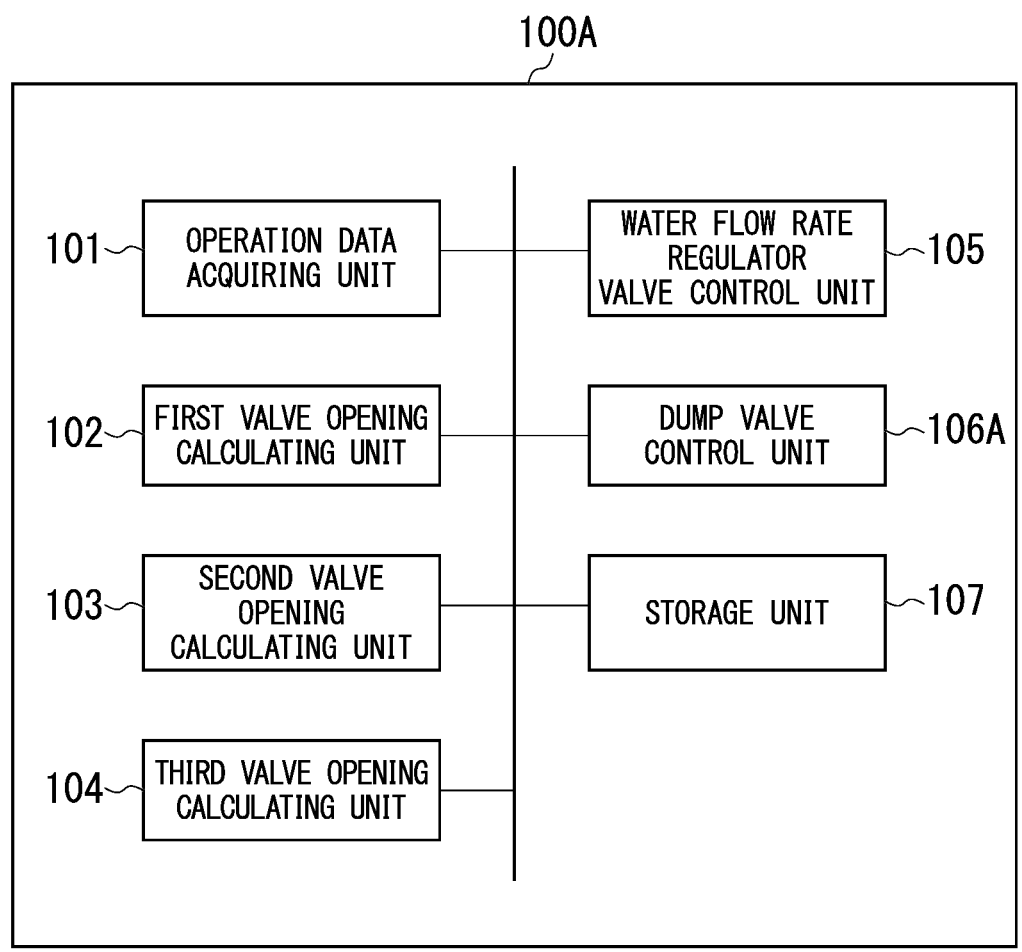
FIG. 6 is a block diagram illustrating a control device according to a second embodiment of the invention.

FIG. 6 is a block diagram illustrating the control device according to the second embodiment of the invention.

Among elements in the second embodiment of the invention, the same elements as the functional units constituting the control device 100 according to the first embodiment will be referred to by the same reference signs and description thereof will not be repeated. As illustrated in the drawing, the control device 100A includes an operation data acquiring unit 101, a first valve opening calculating unit 102, a second valve opening calculating unit 103, a third valve opening calculating unit 104, a water flow rate regulator valve control unit 105, a dump valve control unit 106A, and a storage unit 107.

The dump valve control unit 106A sets a flow rate less than a flow rate of water passing through the water flow rate regulator valve 71 as a target flow rate when the load of the gas turbine 10 is greater than a predetermined value, and sets a flow rate which is calculated using the function element D10 as the target flow rate when the load of the gas turbine 10 is equal to or less than the predetermined value similarly to the first embodiment. When the target flow rate is determined, the dump valve control unit 106A calculates the degree of opening of the dump valve 72 by feedback control on the basis of a difference between the target flow rate and an actual flow rate of water (a measured value from the flowmeter 16).

Control logic of a dotted part in FIG. 7 will be described below in detail with reference to FIG. 7.

Figure 7:
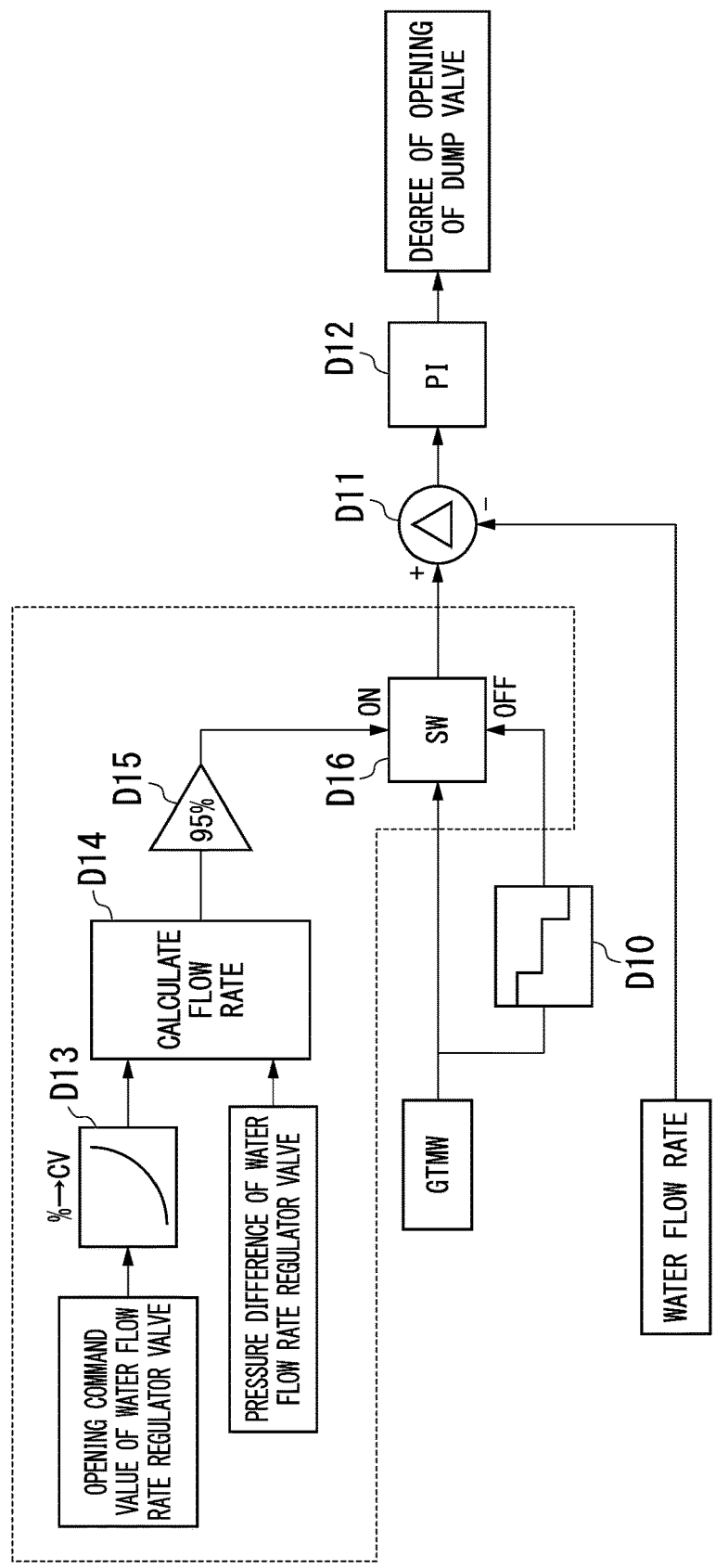
FIG. 7 is a diagram illustrating a method of controlling a flow rate of water which is supplied to a fuel gas heater according to the second embodiment of the invention.

FIG. 7 is a diagram illustrating a method of controlling a flow rate of water to the fuel gas heater in the second embodiment of the invention.

The dump valve control unit 106A includes a function element D10, a subtractor D11, a controller D12, a function element D13, a controller D14, a multiplier D15, and a switch D16. The function element D10 receives an input of the load of the gas turbine 10 and calculates a target flow rate based on the load. The subtractor D11 calculates a difference between the target flow rate and an actual flow rate of water by subtracting the actual flow rate from the target flow rate. The controller D12 calculates a vale opening of the dump valve 72 such that the difference calculated by the subtractor D11 approaches 0 by PI control. The function element D13 receives an input of a valve opening command value to the water flow rate regulator valve 71 and calculates a CV value of the water flow rate regulator valve 71. The controller D14 receives an input of the CV value calculated by the function element D13 and the pressure difference of the water flow rate regulator valve 71 and calculates a flow rate of heated water flowing through the water flow rate regulator valve 71. The calculated flow rate is referred to as a flow rate command value. The controller D14 acquires the measured value from the pressure meter 17 provided upstream from the water flow rate regulator valve 71 and the measured vale from the pressure meter 18 provided downstream therefrom and calculates a pressure difference of the water flow rate regulator valve 71 (the measured value from the pressure meter 17—the measured value from the pressure meter 18). The multiplier D15 receives an input of the flow rate command value of the water flow rate regulator valve 71 calculated by the controller D14 and calculates a target flow rate for a high load by multiplying the flow rate command value by 0.95 (95%). The switch D16 switches the target flow rate between the target flow rate calculated by the function element D10 and the target flow rate (for a high load) calculated by the multiplier D15 on the basis of the magnitude of the load of the gas turbine 10.

A method of calculating a target flow rate for the dump valve 72 will be described below. First, similarly to the first embodiment, the function element D10 receives an input of the load of the gas turbine and calculates a target flow rate. The function element D10 outputs the calculated target flow rate to the switch D16. The target flow rate is a target flow rate for an intermediate or low load.

On the other hand, the target flow rate for a high load is calculated as follows. First, the function element D13 calculates the CV value of the water flow rate regulator valve 71 at the current degree of opening. Then, the controller D14 calculates a flow rate command value flowing through the water flow rate regulator valve 71 on the basis of the CV value and the pressure difference before and after the water flow rate regulator valve 71. The controller D14 outputs the calculated flow rate to the multiplier D15. The multiplier D15 calculates the target flow rate for a high load corresponding to 95% of the flow rate. The multiplier D15 outputs the target flow rate to the switch D16.

The switch D16 receives an input of the load (GTMW) of the gas turbine 10 and outputs the target flow rate for a high load to the subtractor D11, for example, when the load is greater than 80% of a rated load. When the load is equal to or less than 80%, the switch D16 outputs the target flow rate for an intermediate or low load to the subtractor D11.

In the first embodiment, since the water flow rate regulator valve 71 is controlled on the basis of the temperature of the fuel gas and the dump valve 72 is controlled on the basis of the water flow rate, there is a likelihood that both controls will interfere with each other and the water flow rate or the fuel temperature will not be settled in a target value. In this regard, in the second embodiment, the target flow rate in a high-load operation (for example, with a load equal to or greater than 80%) is switched from the valve opening command for the water flow rate regulator valve 71 to the calculated flow rate command value. By setting 95% of the calculated flow rate command value as the target flow rate of the dump valve 72, the flow rate will not become greater than the target flow rate of the water flow rate regulator valve 71. Accordingly, it is possible to appropriately control the fuel temperature without interfering with the water flow rate control. At the time of starting, stopping, or the like in which the load is low, feedback control is performed using the function element D10 that calculates the target flow rate based on the load of the gas turbine 10 similarly to the related art.

In the operation when the target flow rate for a high load which characterizes this embodiment is applied, normally, the value calculated by the subtractor D11 is negative and the dump valve 72 is controlled such that it is fully closed (a degree of opening of 0%), for example, in order to set 95% of the flow command value of the water flow rate regulator valve 71 as the target flow rate. On the other hand, when the water flow rate regulator valve 71 does not operate as commanded due to fixing of the water flow rate regulator valve 71 or the like (when the flow rate flowing through the water flow rate regulator valve 71 is less than the command value), there is a likelihood that an actual flow rate will be less than the target flow rate which is 95% of the flow rate command value. In this case, the dump valve 72 is controlled to a degree of opening (>0%) which can supplement the lack of the flow rate. In this way, in the high-load operation of the gas turbine 10, a backup function of the water flow rate regulator valve 71 is achieved.

A flow of a method of controlling the dump valve 72 according to the second embodiment will be described below.

Figure 8:
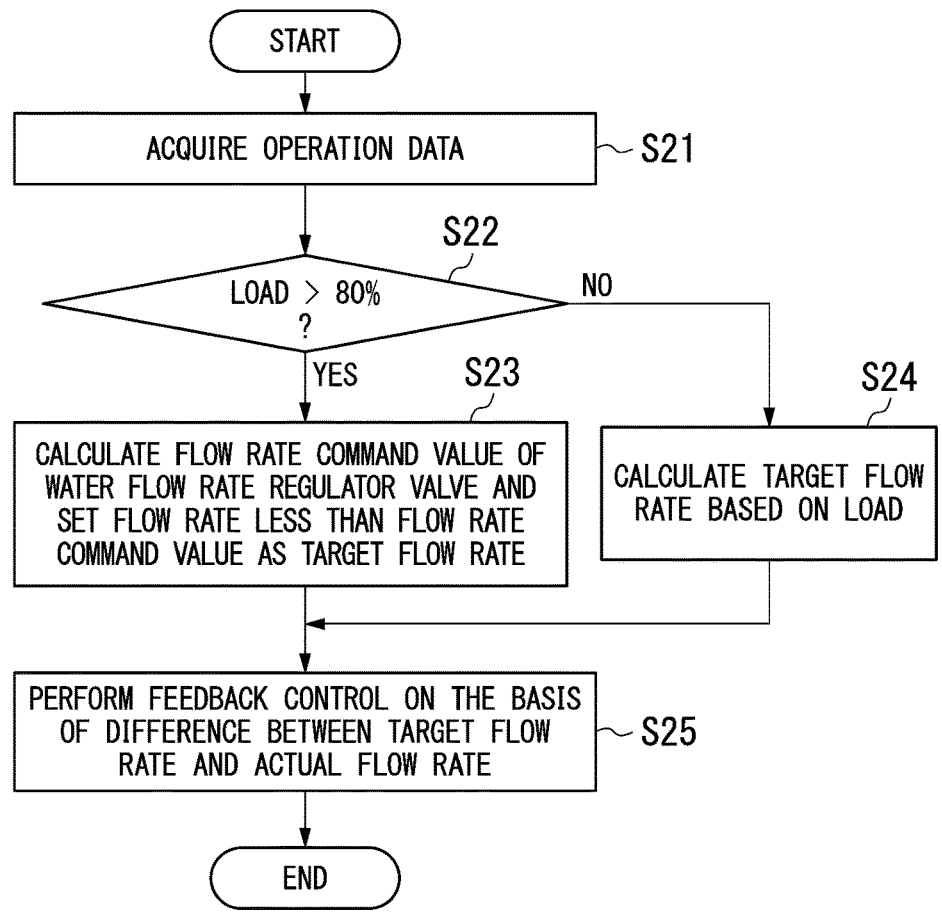
FIG. 8 is a flowchart illustrating an example of a water supply control process according to the second embodiment of the invention.

FIG. 8 is a flowchart illustrating an example of a water supply control process in the second embodiment of the invention.

First, during operation of the GTCC, the operation data acquiring unit 101 acquires operation data (Step S21). Specifically, the operation data acquiring unit 101 acquires the magnitude of the load of the gas turbine 10, a measured value from the flowmeter 16, and an opening command value of the water flow rate regulator valve 71.

Then, the dump valve control unit 106A determines whether the load is greater than 80% of the rated load on the basis of the magnitude of the load of the gas turbine 10 (Step S22). Specifically, the switch D16 receives an input of the value of the gas turbine load and performs the determination. When the load is equal to or less than 80% (NO in Step S22), the dump valve control unit 106A calculates a target flow rate based on the load (Step S24). Specifically, the function element D10 of the dump valve control unit 106A calculates the target flow rate corresponding to the magnitude of the load with the value of the load as an input. The function element D10 outputs the calculated target flow rate to the switch D16. The switch D16 outputs the input target flow rate to the subtractor D11.

When the load is greater than 80% (YES in Step S22), the dump valve control unit 106A calculates the flow rate command value of the water flow rate regulator valve 71 and sets a flow rate (for example, 95%) less than the flow rate command value as a target flow rate (Step S23). Specifically, as described above with reference to FIG. 7, the function element D13 calculates the CV value from the opening command value of the water flow rate regulator valve 71, the controller D14 calculates the flow rate command value of the water flow rate regulator valve 71 from the CV value and the pressure difference, and the multiplier D15 calculates the target flow rate of the dump valve 72 corresponding to 95% of the flow rate command value. The multiplier D15 outputs the calculated target flow rate to the switch D16. The switch D16 outputs the input target flow rate to the subtractor D11.

Then, the dump valve control unit 106A performs feedback control on the basis of the difference between the target flow rate and the actual flow rate (Step S25). Specifically, the subtractor D11 acquires the measured value of the flowmeter 16 from the operation data acquiring unit 101 and calculates a difference by subtracting the measured value from the target flow rate. The controller D12 calculates the degree of opening of the dump valve 72 such that the difference between the target flow rate and the measured value approaches 0. The controller D12 repeatedly performs the process of Step S25 by PI control.

According to this embodiment, in addition to the advantageous effects of the first embodiment, it is possible to prevent interference between fuel temperature control and water flow rate control by setting the target flow rate for a high load to be lower than that in the related art. The dump valve 72 can perform a function of securing a water flow rate at the time of starting, stopping, and partial load operation of the gas turbine 10 as in the related art, and can perform a backup function at the time of operation with a high load of the gas turbine 10. The numerical values of 80% and 95% are only examples and can be changed depending on operation conditions or the like.

Third Embodiment

Hereinafter, a method of controlling a water flow rate to a fuel gas heater according to a third embodiment of the invention will be described with reference to FIGS. 9 to 13.

A control device 100B according to the third embodiment will be described below. The control device 100B performs flow rate control for heated water which is supplied to the fuel gas heater 70 using a method different those in the first and second embodiments. In the third embodiment, a three-way valve is provided upstream from the fuel gas heater 70, and a bypass passage that connects the three-way valve to a part downstream from the fuel gas heater 70 without passing through the fuel gas heater 70 is provided. The control device 100B adjusts a degree of the three-way valve on the fuel gas heater 70 side on the basis of a difference between a target temperature of a fuel gas and a measured value of a fuel gas temperature on the outlet side of the fuel gas heater 70, and controls the flow rate of heated water which passes through the fuel gas heater 70.

Figure 9:
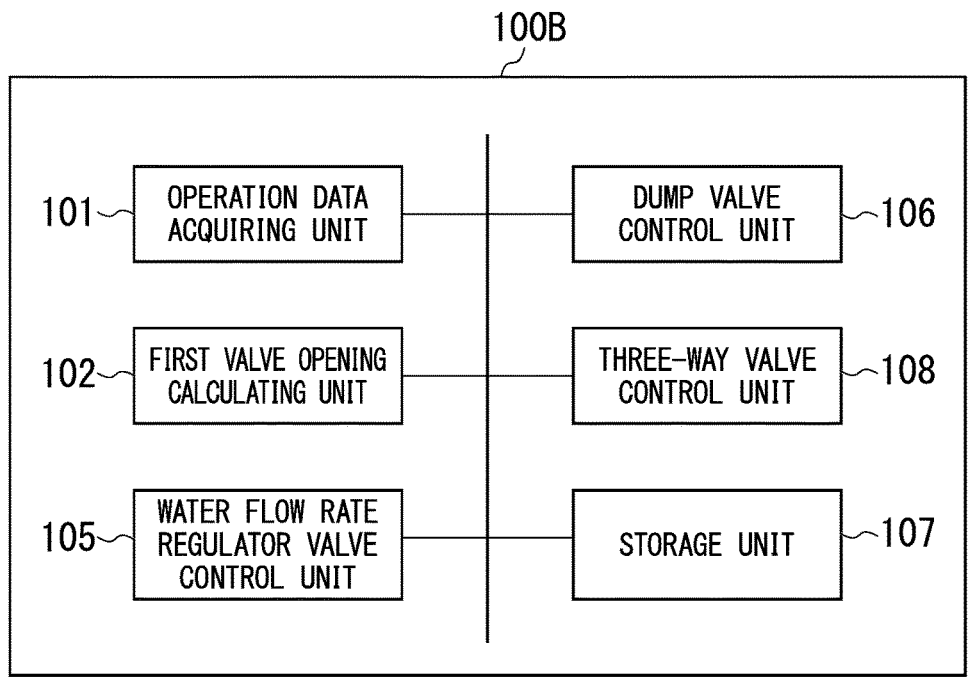
FIG. 9 is a block diagram illustrating a control device according to a third embodiment of the invention.

FIG. 9 is a block diagram illustrating the control device according to the third embodiment of the invention.

Among elements in the third embodiment of the invention, the same elements as the functional units constituting the control device 100 according to the first embodiment will be referred to by the same reference signs and description thereof will not be repeated. As illustrated in the drawing, the control device 100B includes an operation data acquiring unit 101, a first valve opening calculating unit 102, a water flow rate regulator valve control unit 105, a dump valve control unit 106, a storage unit 107, and a three-way valve control unit 108.

The three-way valve control unit 108 controls the degree of opening of a three-way valve 73 on the basis of the difference between the target temperature of the fuel gas and the fuel gas temperature on the outlet side of the fuel gas heater 70.

A water supply system of the fuel gas heater 70 according to the third embodiment will be described below.

Figure 10:
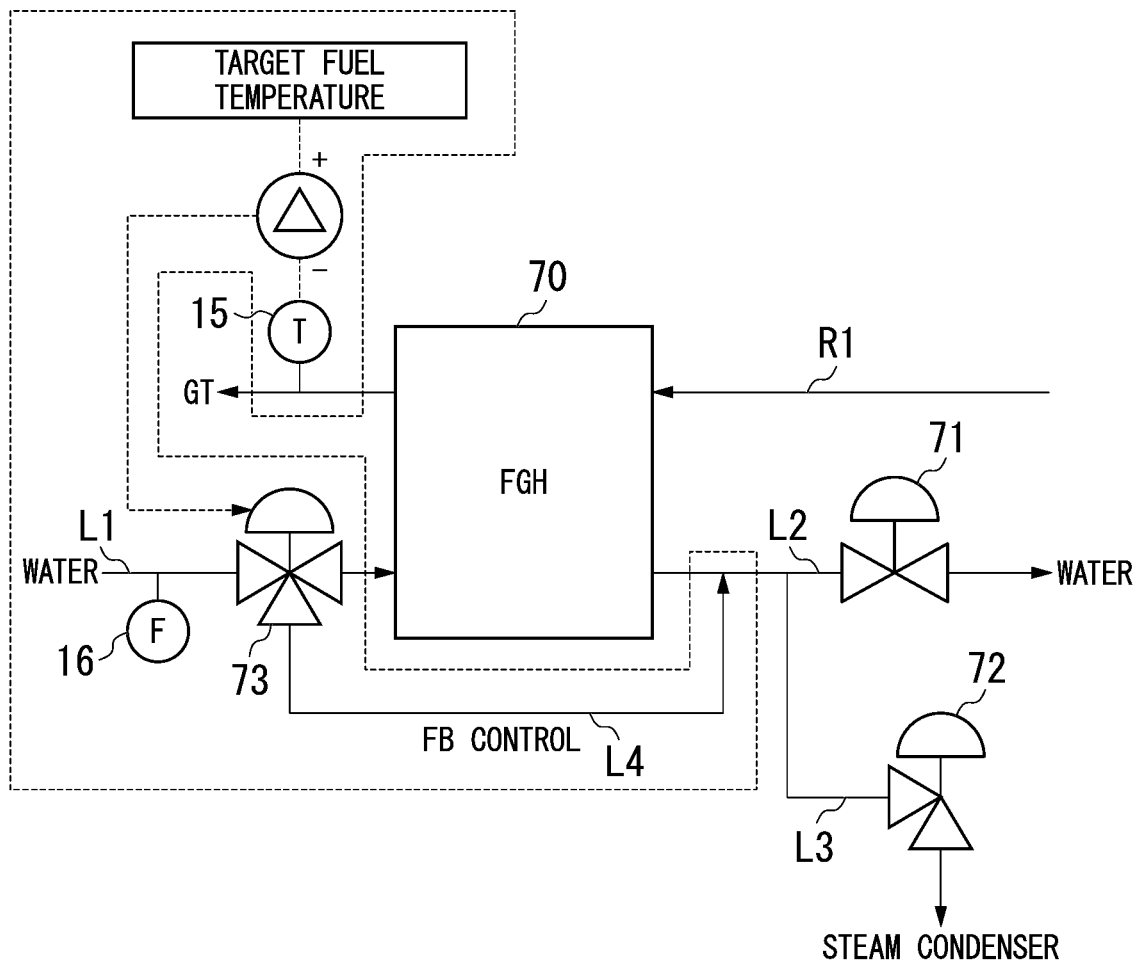
FIG. 10 is a system diagram of a fuel gas heater according to the third embodiment of the invention.

FIG. 10 is a system diagram of the fuel gas heater according to the third embodiment of the invention.

As illustrated in FIG. 10, the three-way valve 73 is provided in the heated water supply line L1 which is upstream from the water supply system of the fuel gas heater 70, and the water flow rate regulator valve 71 is provided in the heated water return line L2 which is downstream therefrom. The dump valve 72 is provided in the condensed water line L3 which branches from the heated water return line L2. The three-way valve 73 includes an inlet into which heated water supplied from the heat recovery steam generator 20 flows, an outlet from which the heated water is discharged to the fuel gas heater 70, and an outlet from which the heated water is discharged to a bypass line L4 connected to a part downstream from the fuel gas heater 70 by bypassing the fuel gas heater 70. The three-way valve control unit 108 adjusts a valve opening of the outlet on the fuel gas heater 70 side and adjusts a proportion of heated water discharged to the fuel gas heater 70 side and a proportion of heated water discharged to the bypass line L4 side. That is, in the third embodiment, the flow rate of heated water flowing through the fuel gas heater 70 is adjusted such that the temperature of fuel gas is adjusted to a desired temperature by controlling the valve opening of the fuel gas heater 70 side.

The thermometer 15 is provided on the outlet side of the fuel gas heater 70 in the fuel line R1. The flowmeter 16 is provided in the heated water supply line L1. The other elements are the same as illustrated in FIG. 1.

Control logic of a dotted part in FIG. 10 will be described below in detail with reference to FIG. 11.

Figure 11:
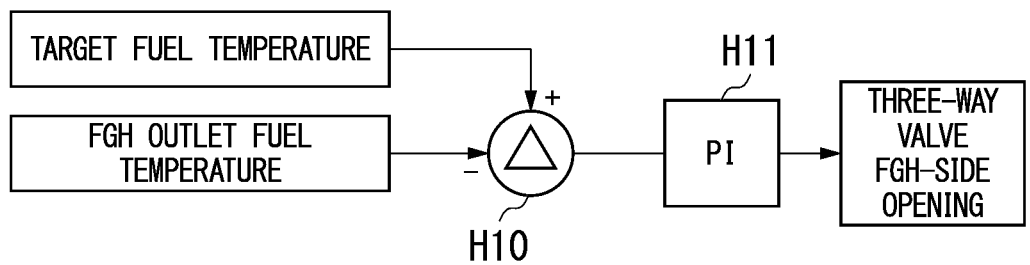
FIG. 11 is a diagram illustrating a method of controlling a flow rate of water which is supplied to the fuel gas heater according to the third embodiment of the invention.

FIG. 11 is a diagram illustrating a method of controlling a flow rate of water to the fuel gas heater in the third embodiment of the invention.

The three-way valve control unit 108 includes a subtractor H10 and a controller H11. The three-way valve control unit 108 acquires the temperature of the fuel gas on the outlet side of the fuel gas heater 70 which is measured by the thermometer 15 from the operation data acquiring unit 101. The three-way valve control unit 108 acquires a target fuel temperature from the operation data acquiring unit 101. The subtractor H10 receives an input of the temperature of the fuel gas on the outlet side of the fuel gas heater 70 and the target fuel temperature and subtracts the temperature of the fuel gas on the outlet side of the fuel gas heater 70 from the target fuel temperature. The controller H11 calculates the valve opening on the fuel gas heater 70 side of the three-way valve 73 such that the difference between the target fuel temperature and the temperature of the fuel gas on the outlet side of the fuel gas heater 70 approaches 0. The three-way valve control unit 108 controls a degree of opening on the fuel gas heater 70 side of the three-way valve 73 such that the degree of opening reaches the valve opening calculated by the controller H11.

A water flow rate control process according to the third embodiment will be described below with reference to FIGS. 12 and 13.

First, control of the three-way valve 73 will be described.

Figure 12:
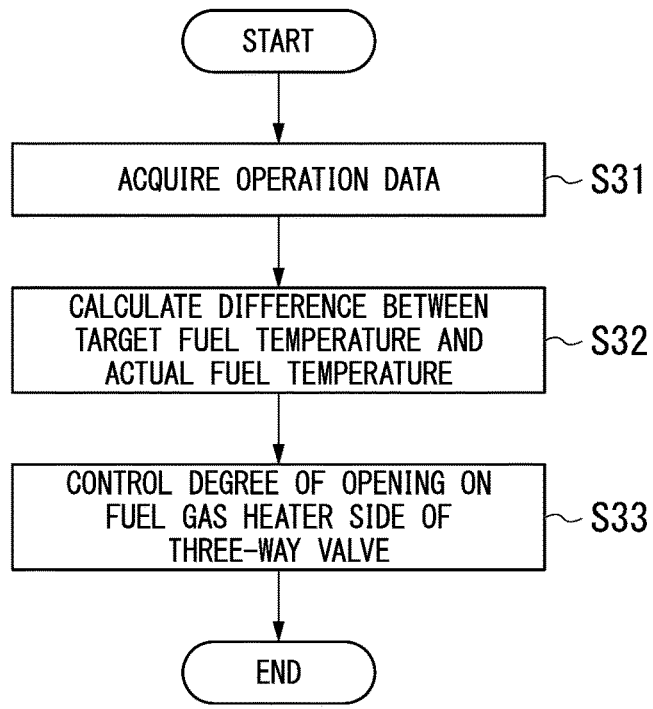
FIG. 12 is a first flowchart illustrating an example of a water supply control process according to the third embodiment of the invention.

FIG. 12 is a first flowchart illustrating an example of the water supply control process according to the third embodiment of the invention.

First, during operation of the GTCC, the operation data acquiring unit 101 acquires operation data (Step S31). Specifically, the operation data acquiring unit 101 acquires a temperature of a fuel gas on the outlet side of the fuel gas heater 70 and a target fuel temperature. The operation data acquiring unit 101 outputs the acquired values to the three-way valve control unit 108. Then, the three-way valve control unit 108 calculates a difference between the target fuel temperature and the actual temperature (Step S32). Specifically, as described above with reference to FIG. 11, the subtractor H10 calculates the difference between the target fuel temperature and the measured value from the thermometer 15. Then, the three-way valve control unit 108 controls the degree of opening on the fuel gas heater 70 side of the three-way valve 73 (Step S33). Specifically, the controller H11 calculates the valve opening for causing the difference between the target fuel temperature and the measured value to approach 0. The three-way valve control unit 108 performs control such that the degree of opening on the fuel gas heater 70 side of the three-way valve 73 reaches the valve opening calculated by the controller H11. The three-way valve control unit 108 repeatedly performs the process of Step S33 by PI control.

An example in which the valve opening on the fuel gas heater 70 side of the three-way valve 73 is controlled in Step S33 has been described, but the valve opening on the bypass line L4 side.

Control of the water flow rate regulator valve 71 and the dump valve 72 will be described below.

Figure 13:
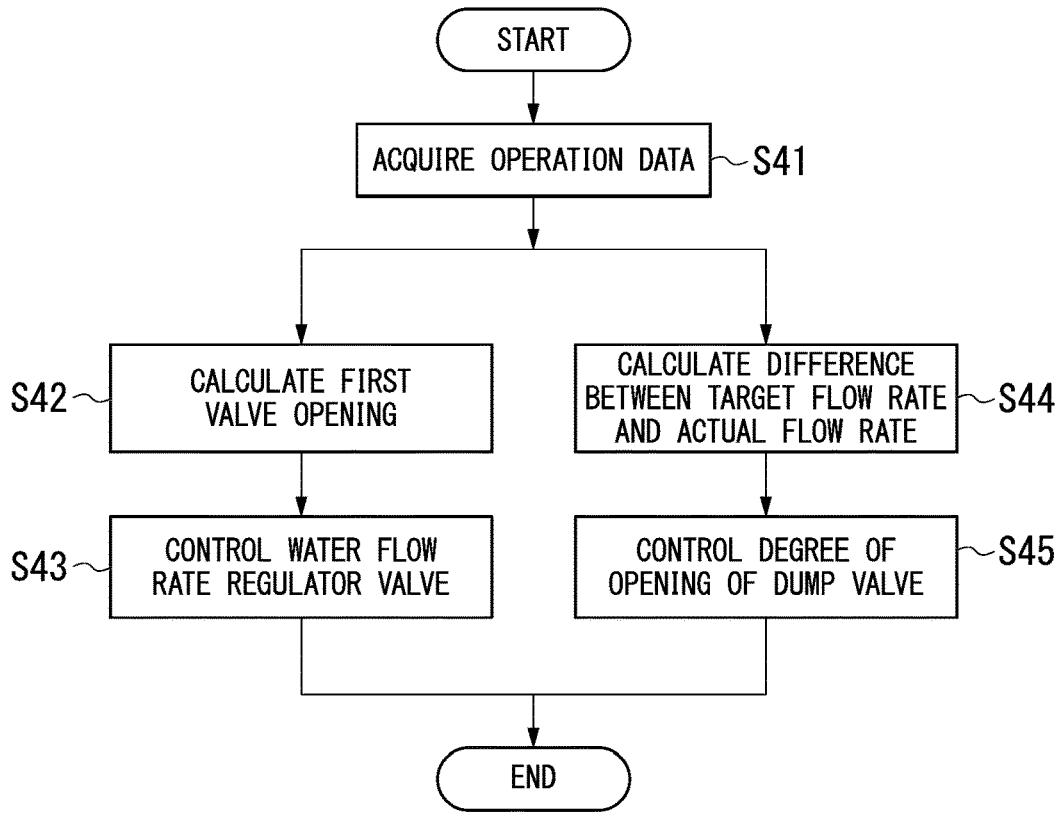
FIG. 13 is a second flowchart illustrating an example of a water supply control process according to the third embodiment of the invention.
Figure 14:
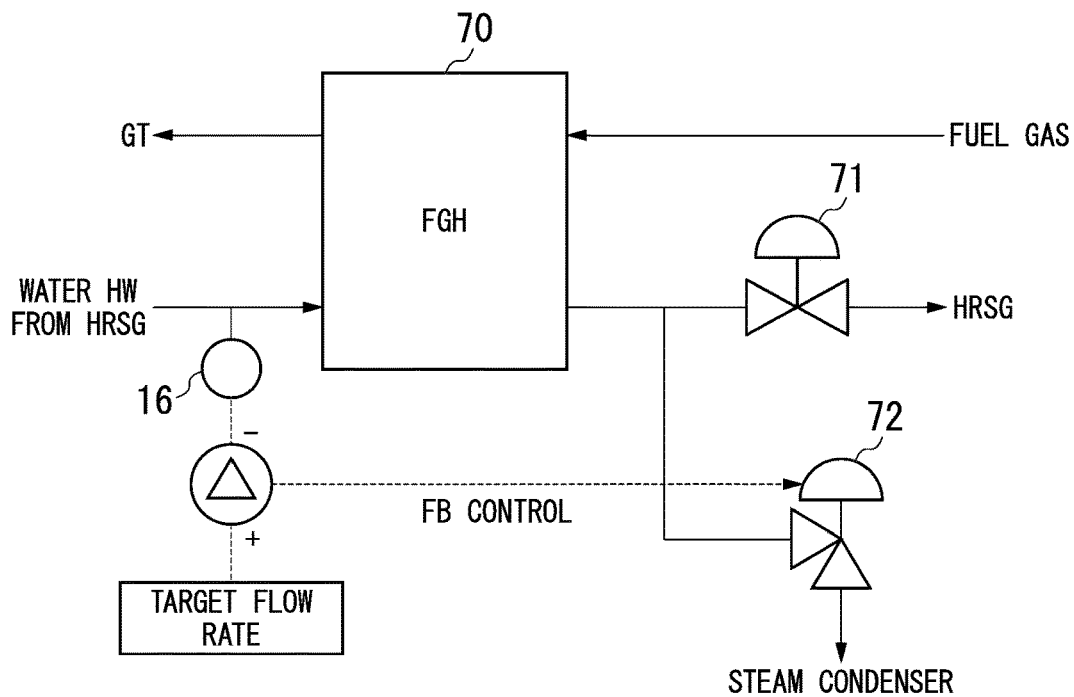
FIG. 14 is a system diagram of a fuel gas heater according to the related art.

FIG. 13 is a flowchart illustrating a second example of the water supply control process according to the third embodiment of the invention.

First, during operation of the GTCC, the operation data acquiring unit 101 acquires operation data (Step S41). Specifically, the operation data acquiring unit 101 acquires the magnitude of the load of the gas turbine 10 and the measured value from the flowmeter 16.

Then, the first valve opening calculating unit 102 calculates the first valve opening based on the magnitude of the load of the gas turbine 10 using a function element P10 (Step S42). The first valve opening calculating unit 102 outputs the first valve opening to the water flow rate regulator valve control unit 105. Then, the water flow rate regulator valve control unit 105 controls the water flow rate regulator valve 71 such that the degree of opening of the water flow rate regulator valve 71 reaches the first valve opening (Step S43).

The dump valve control unit 106 performs the following processes in parallel with Steps S42 and S43. First, the dump valve control unit 106 calculates a target flow rate using the function element D10 and calculates a difference between the target flow rate and the actual flow rate measured by the flowmeter 16 (Step S44). Then, the dump valve control unit 106 calculates a valve opening of the dump valve 72 such that the calculated difference becomes 0, and controls the degree of opening of the dump valve 72 to the calculated valve opening (Step S45). The dump valve control unit 106 repeatedly performs the processes of Steps S44 and S45 by feedback control (for example, PI control).

In this embodiment, the temperature of the fuel gas on the outlet side of the fuel gas heater 70 is monitored and the flow rate of heated water which is supplied from the heat recovery steam generator 20 to the fuel gas heater 70 is controlled such that the temperature of the fuel gas on the outlet side approaches the target fuel temperature by the valve opening control of the three-way valve 73. That is, when the temperature of the fuel gas on the outlet side is high, the valve opening on the fuel gas heater 70 side of the three-way valve 73 is decreased to decrease the flow rate of heated water which flows into the fuel gas heater 70. On the other hand, when the temperature of the fuel gas on the outlet side is low, the valve opening on the fuel gas heater 70 side of the three-way valve 73 is increased to increase the flow rate of heated water which flows into the fuel gas heater 70 and to further heat the fuel gas. Accordingly, the temperature of the fuel gas can be made into a desired temperature.

According to this embodiment, by only newly providing the three-way valve 73 and adding the control logic described above with reference to FIG. 11, the temperature of the fuel gas can be controlled with the control logic of the water flow rate regulator valve 71 or the dump valve 72 maintained as in the related art.

The control devices 100, 100A, and 100B are an example of a control system. At least some of the operation data acquiring unit 101, the first valve opening calculating unit 102, the second valve opening calculating unit 103, the third valve opening calculating unit 104, the water flow rate regulator valve control unit 105, the dump valve control units 106 and 106A, and the three-way valve control unit 108 are functions which are embodied by causing a processor of the control device 100 or the like to read and execute a program from the storage unit 107. Some or all of the operation data acquiring unit 101, the first valve opening calculating unit 102, the second valve opening calculating unit 103, the third valve opening calculating unit 104, the water flow rate regulator valve control unit 105, the dump valve control units 106 and 106A, and the three-way valve control unit 108 may be embodied using hardware such as a microcomputer, a large scale integration (LSI) circuit, an application specific integrated circuit (ASIC), a programmable logic device (PLD), or a field-programmable gate array (FPGA).

Without departing from the gist of the invention, the elements in the above-mentioned embodiments can be appropriately replaced with known elements. The technical scope of the invention is not limited to the above-mentioned embodiments and can be modified in various forms without departing from the gist of the invention.

The operation data acquiring unit 101, the first valve opening calculating unit 102, the second valve opening calculating unit 103, the third valve opening calculating unit 104, the water flow rate regulator valve control unit 105, the dump valve control unit 106, and the storage unit 107 which are included in the control device 100 are an example of a water flow rate adjusting unit. The operation data acquiring unit 101, the first valve opening calculating unit 102, the second valve opening calculating unit 103, the third valve opening calculating unit 104, the water flow rate regulator valve control unit 105, the dump valve control unit 106A, and the storage unit 107 which are included in the control device 100A are an example of a water flow rate adjusting unit. The operation data acquiring unit 101, the first valve opening calculating unit 102, the water flow rate regulator valve control unit 105, the dump valve control unit 106, the storage unit 107, and the three-way valve control unit 108 which are included in the control device 100B are an example of a water flow rate adjusting unit. The GTCC is an example of a power generation plant.

INDUSTRIAL APPLICABILITY

With the control system, the gas turbine, the power generation plant, and the method of controlling a fuel temperature, it is possible to control a temperature of a fuel in a desired temperature by controlling a flow rate of water which is supplied to the fuel gas heater while monitoring the temperature of the fuel on the outlet side of the fuel gas heater.

REFERENCE SIGNS LIST

10 Gas turbine
11 Compressor
12 Combustor
13 Turbine
14, 15 Thermometer
16 Flowmeter
20 Heat recovery steam generator
21 High-pressure steam generating unit
22 Intermediate-pressure steam generating unit
23 Reheating unit
24 Low-pressure steam generating unit
30 Steam turbine
31 High-pressure steam turbine
32 Intermediate-pressure steam turbine
33 Low-pressure steam turbine
34 Power generator
35 Steam condenser
41 High-pressure main steam line
42 High-pressure steam stop valve
43 High-pressure main steam governor valve
44 Intermediate-pressure steam line
45 Intermediate-pressure steam stop valve
46 Intermediate-pressure steam governor valve
51 Low-pressure main steam line
52 Low-pressure steam stop valve
53 Low-pressure main steam governor valve
54 Intermediate-pressure turbine exhaust line
55 Water supply line
61 Intermediate-pressure main steam line
70 Fuel gas heater
71 Water flow rate regulator valve
72 Dump valve
73 Three-way valve
R1 Fuel line
L1 Heated water supply line
L2 Heated water return line
L3 Steam condensing line
L4 Bypass line
DC Branch point
100, 100A, 100B Control device
101 Operation data acquiring unit
102 First valve opening calculating unit
103 Second valve opening calculating unit
104 Third valve opening calculating unit 105 Water flow rate regulator valve control unit
106, 106A Dump valve control unit
107 Storage unit
108 Three-way valve control unit
P10, P11, D10, D13 Function element
P12, D15 Multiplier
P13, D11, H10 Subtractor
P14 Adder
D12, D14, H11 Controller
D16 Switch

The invention claimed is:

1. A control system configured to control a flow rate of heated water which is supplied from a supply device of heated water for heating a fuel of a gas turbine to a fuel gas heater configured to heat the fuel by adjusting a degree of opening of a water flow rate regulator valve configured to regulate a flow rate of heated water which is recovered from the fuel gas heater to the supply device of heated water and control a temperature of the fuel which is supplied to a combustor of the gas turbine via the fuel gas heater, the control system comprising:
a first valve opening calculating unit configured to calculate a first valve opening which is a degree of opening of the water flow rate regulator valve based on a load of the gas turbine;
a third valve opening calculating unit configured to calculate a third valve opening by calculating a correction value based on a difference between a target temperature of the fuel which is supplied to the combustor of the gas turbine and the temperature of the fuel on an outlet side of the fuel gas heater and adding the correction value to the first valve opening; and
a water flow rate regulator valve control unit configured to control the degree of opening of the water flow rate regulator valve based on the third valve opening.

2. The control system according to claim 1, wherein the control system is configured to control the flow rate of the heated water which is supplied from the supply device of heated water to the fuel gas heater by adjusting the degree of opening of the water flow rate regulator valve and a degree of opening of a dump valve configured to regulate a flow rate of heated water which is dumped to a steam condenser and control the temperature of the fuel through the control of the flow rate of the heated water, and
wherein the control system further comprises a dump valve control unit that controls configured to control the degree of opening of the dump valve based on a difference between a target flow rate of the heated water which is determined in advance based on the load of the gas turbine and an actual flow rate.

3. The control system according to claim 2, wherein the third valve opening calculating unit is configured to calculate the correction value by feedback control.

4. The control system according to claim 2, further comprising a second valve opening calculating unit configured to calculate a second valve opening by multiplying the first valve opening by a coefficient based on a temperature of the fuel on an inlet side of the fuel gas heater,
wherein the third valve opening calculating unit is configured to calculate the third valve opening by adding the correction value to the second valve opening instead of the first valve opening.

5. The control system according to claim 2, wherein the dump valve control unit is configured to control the degree of opening of the dump valve using a flow rate which is less than the flow rate of the heated water passing through the water flow rate regulator valve as a target flow rate.

6. The control system according to claim 5, wherein the dump valve control unit is configured to set a flow rate which is less than the flow rate of the heated water passing through the water flow rate regulator valve as the target flow rate when the load of the gas turbine is equal to or greater than a predetermined value.

7. A gas turbine comprising:
a compressor;
a combustor;
a turbine; and
the control system according to claim 1.

8. A power generation plant comprising:
the gas turbine according to claim 7;
a steam turbine; and
a power generator.

9. A control system configured to control a flow rate of heated water which is supplied from a supply device of heated water for heating a fuel of a gas turbine to a fuel gas heater configured to heat the fuel by adjusting a degree of opening of a three-way valve, which is provided upstream in a path of the heated water in the fuel gas heater and configured to switch a proportion of the heated water sent out to the fuel gas heater and a proportion of the heated water sent out to a path bypassing the fuel gas heater, a degree of opening of a water flow rate regulator valve configured to regulate a flow rate of heated water which is recovered from the fuel gas heater to the supply device of heated water, and a degree of opening of a dump valve configured to regulate a flow rate of heated water which is dumped to a steam condenser and control a temperature of the fuel which is supplied to a combustor of the gas turbine via the fuel gas heater, the control system comprising:
a first valve opening calculating unit configured to calculate a first valve opening which is a degree of opening of the water flow rate regulator valve based on a load of the gas turbine;
a water flow rate regulator valve control unit configured to control the degree of opening of the water flow rate regulator valve based on the first valve opening;
a dump valve control unit configured to control the degree of opening of the dump valve based on a difference between a target flow rate of the heated water which is determined in advance based on the load of the gas turbine and an actual flow rate; and
a three-way valve control unit configured to control the degree of opening of the three-way valve based on a difference between a target temperature of the fuel and the temperature of the fuel on an outlet side of the fuel gas heater.

10. A control system configured to control a temperature of a fuel by controlling a flow rate of heated water which is supplied from a supply device of heated water to a fuel gas heater configured to heat a fuel of a gas turbine by adjusting a degree of opening of a water flow rate regulator valve configured to regulate a flow rate of heated water which is recovered to the supply device of heated water and a degree of opening of a dump valve configured to regulate a flow rate of heated water which is dumped to a steam condenser, the control system comprising:
a first valve opening calculating unit configured to calculate a first valve opening which is a degree of opening of the water flow rate regulator valve based on a load of the gas turbine;
a second valve opening calculating unit configured to calculate a second valve opening by multiplying a coefficient based on the temperature of the fuel on an inlet side of the fuel gas heater by the first valve opening; and a water flow rate regulator valve control unit configured to control the degree of opening of the water flow rate regulator valve based on the second valve opening.

11. A method of controlling a fuel temperature, the method comprising causing a control system that controls a temperature of a fuel which is supplied to a combustor of a gas turbine via a fuel gas heater, which heats the fuel of the gas turbine, by adjusting a flow rate of heated water which is supplied to the fuel gas heater to perform:

controlling a flow rate of heated water which is supplied from a supply device of heated water to the fuel gas heater through a step of controlling a degree of opening of a water flow rate regulator valve that regulates a flow rate of heated water which is recovered from the fuel gas heater to the supply device of heated water and controlling a temperature of the fuel by the control of the flow rate of the heated water, wherein the step of controlling the degree of opening of the water flow rate regulator valve includes:

calculating a first valve opening which is a degree of opening of the water flow rate regulator valve based on a load of the gas turbine, and calculating a third valve opening by calculating a correction value based on a difference between a target temperature of the fuel which is supplied to the combustor of the gas turbine and the temperature of the fuel on an outlet side of the fuel gas heater and adding the correction value to the first valve opening.

* * * * *